United States Patent [19]
Sumida

[11] 3,832,772
[45] Sept. 3, 1974

[54] PNEUMATIC HAND TOOL
[75] Inventor: Kunio A. Sumida, Los Angeles, Calif.
[73] Assignee: Shapiro, Leonard U., St. Paul, Minn.
[22] Filed: June 2, 1972
[21] Appl. No.: 259,309

[52] U.S. Cl. ............... 30/392, 30/123.3, 30/272 R, 173/59
[51] Int. Cl. ............................................. B27b 19/08
[58] Field of Search ............ 30/272, 392, 393, 394, 30/371, 166, 220, 241, 123.3; 74/44; 173/59, 169

[56] References Cited
UNITED STATES PATENTS

| | | | |
|---|---|---|---|
| 1,651,823 | 12/1927 | Kelleher | 30/241 |
| 1,937,586 | 12/1933 | Ortt | 30/216 X |
| 2,506,736 | 5/1950 | Oschwald | 30/392 X |
| 2,946,315 | 7/1960 | Doeden | 173/59 |
| 3,561,115 | 2/1971 | Palm | 30/218 |
| 3,571,874 | 3/1971 | Arx | 173/169 |

FOREIGN PATENTS OR APPLICATIONS

| | | | |
|---|---|---|---|
| 483,135 | 5/1952 | Canada | 30/392 |
| 1,170,845 | 11/1969 | Great Britain | 30/392 |
| 1,193,202 | 4/1059 | France | 30/241 |

*Primary Examiner*—Al Lawrence Smith
*Assistant Examiner*—J. C. Peters
*Attorney, Agent, or Firm*—Smyth, Roston & Pavitt

[57] ABSTRACT

A hand tool, such as a saber saw, in which the motive power is provided by a fluid which actuates a rotary motor. The rotary motor drives an eccentric-universal drive system which converts the rotary output into a linear reciprocation along an axis situated at a predetermined angle relative to the axis of the motor. Air exhausting from the motor cools the bearing surfaces of the reciprocating tool, pressurizes the interior of the housing to prohibit foreign material ingestion, and blows workpiece chips away from the tool housing and the cutting area.

4 Claims, 3 Drawing Figures

PATENTED SEP 3 1974 3,832,772

PNEUMATIC HAND TOOL

BACKGROUND OF THE INVENTION

In the manufacture and use of hand tools it is well known that pneumatically operated tools are safer to utilize than electrically powered tools since the possibility of the generation of an electrical potential difference between the tool body and a ground is substantially totally obviated.

Many presently available pneumatic tools comprise devices which, acting through gearing and linkages, drive tools of varying uses and configurations. For example, in many instances a reciprocating piston is utilized to reciprocate a tool such as a sander or a saw in order to drive the tool as it acts upon the workpiece. In some instances, the drive is direct and the piston and tool move in substantially identical planes.

In other cases, suitable linkages are provided to allow the piston and tool to be located at substantially right angles to one another. In either case, unfortunately, as a load is applied to the tool by contact with the workpiece, the piston stroke will become diminished, thereby effectively reducing the stroke and speed of the tool across the workpiece. As a result, overall tool efficiency is less than otherwise desirable.

In hand tools of this nature, most of the prior art devices are formed with a handgrip portion of the housing or body positioned at substantially a right angle with that portion of the body which supports the working tool per se. Although this basic configuration usually produces satisfactory results as far as the mechanical drive system is concerned, such hand tools are inconvenient for an operator to use. In most instances, his view of the area of contact between the tool and the workpiece will usually be blocked by the hand tool housing and he is required to hold the hand tool in a position which is both unnatural and uncomfortable for his wrist if maintained for any length of time.

Small hand tools have also long been susceptible to dirt and foreign matter getting into the body of the hand tool and causing deterioration and wear thereof. This is particularly true of hand tools having reciprocating tools, such as saber saws. For example, on the withdrawal or return stroke of the saw, it is possible that the blade teeth may draw cut particles of the workpiece toward or even into the body. It has become quite apparent to those skilled in the art that the foreign particles thus introduced to the body rapidly increase the wear and deterioration of the various bearings in the body. In order to obviate this possibility, various seal structures have been devised but these seal structures add to the expense of the hand tool and eventually became worn themselves.

Saber saws are also susceptible to having the blades become softened or annealed due to the heat generated by friction between the blade and the workpiece. When such saws are utilized in "heavy duty" applications, such as a professional shop, some means must be provided to cool the blade so that its useful life will not be uneconomically short.

Consequently, it has become necessary to devise a hand tool which an operator may hold and control without being subjected to rapid fatigue resulting from the position in which the tool must be maintained relative to the workpiece. Further, it is desirable that such a tool be equipped with a simple and inexpensive means for preventing foreign matter from getting into the tool body and a means for cooling the cutting blade.

SUMMARY OF THE INVENTION

The present invention relates to a hand tool structure which obviates the disadvantages described with reference to the prior art.

More specifically, the present invention relates to a hand tool which is formed in such a way that the handgrip surface of the tool is related to the barrel in which the tool per se is supported in a manner similar to that in which a pistol handle is related to its barrel. In other words, the axes of the handle and barrel of the hand tool form an obtuse angle. As a result, an operator may hold the hand tool in a position which is not uncomfortable or fatiguing for his wrist, while allowing him to stand in such a position that he can easily see and control the movement of the tool across the workpiece.

If desired, a pneumatic motor may be positioned within the handle of the apparatus to provide suitable motive power for the tool. An eccentric segment element may be suitably fastened to the rotatable shaft of the pneumatic motor which, in turn, may be connected, via a universal linkage, to a reciprocating tool guided for movement parallel to the axis of, and within, the barrel.

Although the invention may be utilized with an eccentric drive motor, it will be realized by those skilled in the art that a pneumatic motor is relatively simple to maintain and, in general, can produce greater power than an electric motor of comparable size. Further the use of a pneumatic motor obviates the possibility of creating a potential difference between the hand tool body and the operator, as might occur if wiring within an electrically driven hand tool became damaged or worn.

As an additional advantage of the use of a pneumatic motor in such a hand tool, suitable passages may be provided within the machine body to direct the air exhausting from the pneumatic motor outwardly through the barrel around the reciprocating tool. Such a feature would allow the tool and its associated bearings to be constantly cooled, thereby decreasing the cost of the materials which must be used at the bearing surfaces. Even more importantly, however, if the exhausting air passes from the barrel about the reciprocating tool, it will create a pressure flow which will tend to blow all foreign matter, work chips, etc., away from the machine body, thereby positively preventing such matter from entering the body and damaging the bearings.

The pressure flow past the tool will also serve to cool the tool since the flow will tend to remove heat due to standard heat transfer functions. Further, the air, expanding due to its previous compression for driving the tool, will become even further cooled by the expansion and will thus increase heat flow from the tool to the air. In the case of a saber saw, for example, the cooling of the blade will prevent annealing and thus dramatically increase blade life.

If the pneumatic motor comprises a rotatable motor rather than a piston-cylinder combination, the load generated by contact of the tool and the workpiece will not decrease the stroke or speed of the tool since the eccentric driver segment may be fixed upon the motor shaft. Consequently, when the tool acts upon a workpiece, the speed of reciprocation of the tool may be slowed somewhat due to friction, but its stroke and speed will remain essentially constant. This is particularly significant in the exemplary case of a saber saw since the efficiency of the saw is governed to a large extent, by the number of teeth which contact the workpiece on each stroke.

Many other advantages and objects of the present invention will become apparent to those skilled in the art upon reading of the following Detailed Description, taken together with the accompanying drawings. It will also be realized by those skilled in the art that the Detailed Description and drawings merely comprise an exemplary teaching of what is presently considered to be a preferred embodiment of the best mode of carrying out the invention.

DETAILED DESCRIPTION

Figure 1:
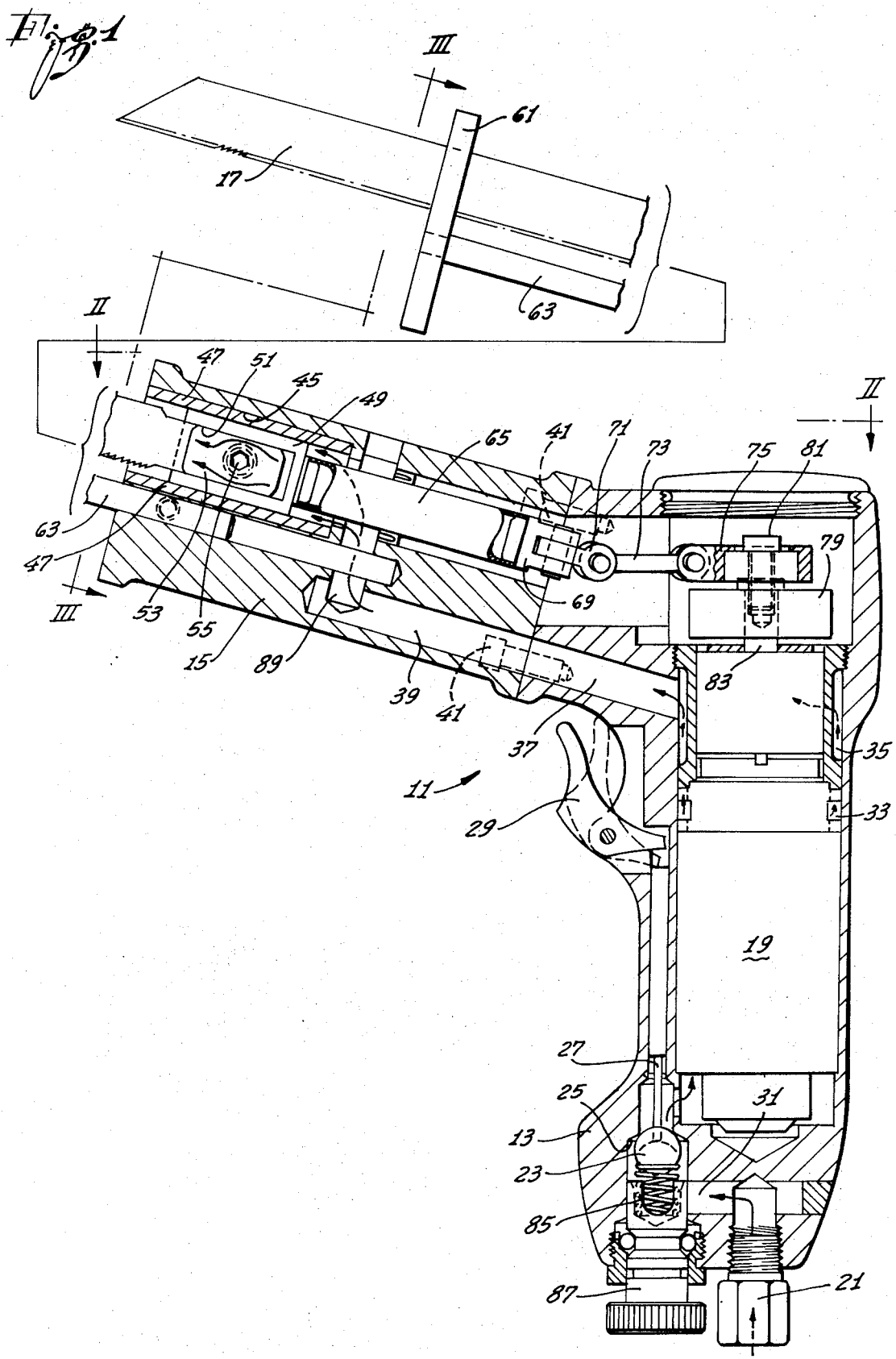
FIG. 1 is a side elevation—showing many parts in section to illustrate details—of a hand tool formed in accordance with the present invention; in this instance the illustrated tool is a saber saw.

One form of tool embodying the concepts of the present invention has been illustrated as comprising a basic hand tool comprising a body or housing generally designated 11 having a handle or handgrip 13 and a barrel 15. As is clearly shown in FIG. 1, the axes of the handle and barrel are not perpendicular to one another, as is usually the case with the prior art hand tools. Instead, the axes form an obtuse angle so that the basic configuration of the device resembles a pistol. Consequently, an operator can hold the hand tool in a position such that the barrel 15 is perpendicular to the workpiece; at the same time, the handle is thus positioned so that the entire machine rests comfortably in the operator's hand without creating fatigue in his wrist and arm. As an added benefit of this relationship, the operator is free to move the tool to a variety of positions without losing sight of the precise relationship between a tool, such as the saw blade 17, and the workpiece (not shown). Thus, the operator is able to hold the machine comfortably for long periods of time whioe controlling its movement with an increased degree of accuracy.

Any suitable power source may be utilized to reciprocate the tool 17. However, in the illustrated embodiment a rotatable pneumatic motor 19 may be suitably mounted in the handle in any desired fashion and driven by air from a source (not shown) which is delivered to the handle through a coupling 21. In the illustrated embodiment, a ball valve 23 is spring-biased against a valve seat 25 and may be driven away from the seat by means of a pin 27 selectively actuated by a finger trigger 29.

In operation, when the trigger 29 is depressed against the handle 13, as shown in phantom in FIG. 1, air may pass through the coupling 21, a series of inlet passages 31, the valve seat 25, and into the motor 19, all as shown by the arrows. Air exhausted from the motor may then traverse a series of passages 33 and 35 and enter a passage 37 in communication with a passage 39 in the barrel 15.

The barrel 15 may be fastened to the handle portion 13 by any suitable means, such as bolts 41 which may be removed when it is desired to service the machine or replace the tool 17.

An aperture 45 may be formed in the nose of the barrel 15 so as to receive a bearing 47 extending substantially the entire length of the aperture and cut away on the internal surfaces thereof to receive a tool block 49 for reciprocation therein. The tool block 49 may be formed with a recess 51 for receipt of the tool 17. In the exemplary machine illustrated, the recess 51 may be substantially flat for receipt of the saber saw blade 17 which is held tightly within the recess by means of a clamp plate 53 tightened thereagainst by a bolt 55. The bolt may pass through the clamp plate 53, saw blade 17, and into a threaded recess (not shown) in the block 49. Suitable cutting away of the nose bearing 47 will provide sufficient clearance for the head of the bolt 55.

If desired, a front plate 61 may be fastened to the barrel 15 by any suitable means such as rods 63 which may be moved in and out of the barrel and adjustably located so as to locate the plate 61.

With the above-described structure, the blade may be reciprocated in and out of the nose of the barrel by reciprocation of the blade block, clamping plate, and bolt 55. In order to reciprocate the blade clamping structure, a drive tube 65 may be suitably fastened to the rear end of the tool block 49 by any suitable method such as brazing. At the opposite end of the drive tube, a clevis 69 may be fastened to the tube also by being brazed thereto, if desired. A universal linkage 71, 73 may be suitably pivotally attached to the clevis 69 at one end thereof and to a bearing housing 75 at the opposite end thereof.

In the illustrated embodiment, the bearing housing 75 is shown as capturing a bearing 77 which is suitably eccentrically connected to a flywheel-type segment 79 by any desired means such as bolt 81. In turn, the segment 79 may be fixedly attached to the rotor shaft 83 of the motor 19.

Figure 2:
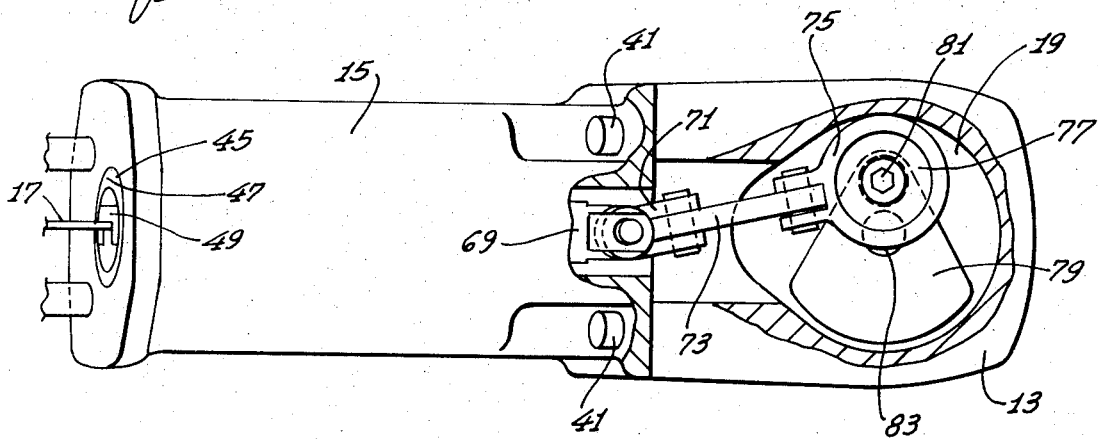
FIG. 2 is a top plan view, partially in section, of the hand tool shown in FIG. 1 as seen along a line II—II thereof.
Figure 3:
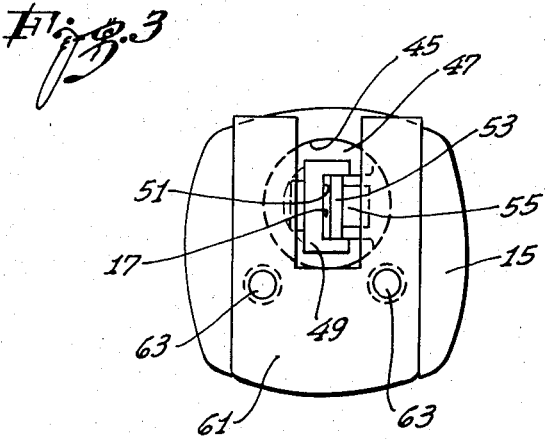
FIG. 3 comprises an elevation view of the forward end of the barrel of the hand tool shown in FIG. 1, as seen along a line III—III thereof.

It will be seen from a review of FIG. 2 that the rotation of the rotor shaft 83, transmitted through the segment 79, will tend to reciprocate the universal linkage 71, 73, the clevis 69, and the remaining connecting structure so as to properly reciprocate the saw blade 17.

The segment 79 may be a completely circular member and coaxial with the shaft 83. In FIG. 2, however, the eccentric segment 79 has been illustrated as being a partial segment of a circular member so that, in addition to acting as an eccentric member, it will also act as a flywheel-type of counterweight in order to offset the reciprocating forces generated in the tool blade 17 and the linkage interconnecting the blade with the eccentric. Consequently, the machine may be substantially dynamically balanced, thereby allowing more accurate control of the tool on the workpiece by the operator since the tendency of the tool to vibrate and/or reciprocate as a reaction of the force between the tool and workpiece will be obviated.

In use, the operator may pick up the machine 11 by gripping the handle 13 in such a way that his index finger rests against the trigger 29. When the operator tightens his finger to actuate the trigger, the pin 27 will depress the ball valve 23 away from the seat 25 against the force of the spring 85. If desired, the spring force, and therefore the air volume, may be adjusted by suitably turning an adjustment knob 87 in a well-known fashion.

As described previously, when the trigger is depressed, air passing through the coupling 21 and passage 31 will flow past the ball 23 and valve seat 25 into the motor 19 as shown by the arrows in FIG. 1. As the motor rotates, it will drive the eccentric segment 79 about the axis of motor shaft 83, thereby causing rotation of the bearing housing 75 with consequent reciprocation of the tool 17 and its related structure.

As the air is exhausted from the motor 19, it will pass through passages 33, 35, 37, and 39 as illustrated by the arrows and will then enter a passage 89 for communication to the interior of the bearing 47. In this exemplary manner, the air exhausting from the pneumatic motor may be utilized to slightly pressurize the interior of the body and cool the bearing in which the tool 17 is mounted, as well as to create an outwardly directed airflow from the nose of the barrel 15. A simple analysis of this flow will reveal that the air exhausting from the nose of the barrel will tend to blow all foreign matter, chips of the workpiece, etc., away from the tool and prevent any entry thereof into the space between the bearing and the blade clamping structure. Of course, it will be realized that this feature of the invention reduces wear within the bearing because it prevents the entry of the foreign material as well as provides for cooling of the bearing. As a direct result, tool reliability and economy are greatly increased. Similarly the pressurization of the body interior will serve to prohibit foreign matter ingestion through other openings in the tool.

It is very important to realize that the air passing about the tool or blade 17 serves a very useful function in addition to that described above since it will absorb heat from the blade as it passes. Still further, however, a real advantage derived from powering the hand tool 11 by compressed air is achieved in this feature. Since the air has been compressed, it will partially expand as it passes through the motor and then continue to expand as it passes about the blade and out of the housing, thereby becoming cooler than the ambient air. This reduction in air temperature increases the ability of the air to absorb even more heat due to the increased temperature differential between the blade and the expanding air. Consequently, the tool blade will run at a relatively low temperature, obviating annealing problems and considerably increasing the useful life of the blade.

In other words, proper design of the shapes and sizes of the air passages, cavities, etc., within the housing, as well as bearing clearances, etc., within the barrel will cause the expansion of the compressed air as it passes through the motor and then out of the housing to be reasonably well controlled both in the motor and about the tool, allowing sufficient tool cooling to achieve the desired results.

In this manner, the invention clearly relates to an improved hand tool machine having an elongated life span and which may be accurately and easily controlled by the operator. Other features and embodiments of the invention will now become apparent to those skilled in the art and it will be realized that the inventive concepts may be utilized in a wide variety of structures which are well within the scope and context of the invention.

I claim:

1. A powered hand saw comprising a housing having a first element including
        means for supporting a rotary pneumatic motor therein and
    a second element including
        a first end,
        a second, open end, and
        means for supporting a reciprocatable saw blade in said second element near said second end, said second element being fixed to said first element at said first end of said second element and forming a predetermined, fixed obtuse angle therebetween in order to improve the hand tool balance characteristics,
    a rotary pneumatic motor mounted in said first element on said motor supporting means,
    a rotatable shaft driven by said rotary pneumatic motor and extending parallel to the axis thereof,
    an eccentric means fixed to said rotatable shaft for rotation therewith at a location near the attachment of said first and second elements and including
        counterweight means thereon,
    a reciprocatable saw blade mounted in said second element on said reciprocatable saw blade supporting means and extending outwardly beyond said housing from said open second end of said second element,
    a universal link means disposed in the first and second elements near the attachment between said first and second elements and fixed to said eccentric means at one end thereof and to said reciprocatable saw blade supporting means at the other end thereof to convert the rotary motion of said rotary pneumatic motor directly to reciprocating movement of said saw blade, and
    means supported by the first element and extending through the first element into operatively coupled relationship with the rotary pneumatic motor and actuatable to provide a rotation of the rotary pneumatic motor and a reciprocation of said saw blade.

2. The saw of claim 1 including
    a bearing fixed in said second element near said second end thereof,
    a tool block, to which said reciprocatable saw blade is fastened, which is attached to said universal link means, said tool block being mounted in said bearing for reciprocation relative thereto, and
    means for directing all of the air exhausted from said rotary pneumatic motor into, through, and out of the interior of said housing about said bearing and said tool block and outwardly through said second end of said second element such that the final expansion to ambient pressure of the air both cools said reciprocatable saw blade and removes chips from the area of contact of the saw blade and workpiece.

3. A cutting tool comprising
    a housing having
        a first element including
            means for supporting a rotary pneumatic motor for rotation in said first element and a second element having
an open end thereof and
means near said open end thereof for supporting a reciprocatable saw blade for reciprocating motion comprising
a bearing fixed in said second element near said open end thereof and
a tool block, to which a reciprocatable saw blade may be fastened to extend through said open end, mounted in said bearing for reciprocation therein, said first and second elements being attached to one another near one end of the first and second elements and forming a predetermined fixed obtuse angle therebetween, said open end of said second element being at the opposite end of its attachment to said first element,
a rotary pneumatic motor mounted on said supporting means in said first element,
linkage means, disposed in said first and second elements near the position of attachment of said first and second elements, interconnecting said motor and said tool block for conversion of the rotary motion of said motor into a reciprocating motion of said tool block,
means extending through said first element and operatively coupled to said rotary pneumatic motor to provide compressed air to said motor for rotation thereof, and
means for directing all of the air exhausted from said rotary pneumatic motor, at a pressure greater than ambient pressure, into, through, and out of the interior of said housing about said bearing and said tool block and outwardly through said open end of said second element such that the final expansion to ambient pressure of the air both cools a reciprocatable saw blade mounted on said tool block and blows chips away from the area of contact of the saw blade and a workpiece.

4. The hand tool of claim 3 including
a rotatable shaft in said first element extending parallel to the axis of said rotary pneumatic motor and driven in rotation thereby,
a rotatable eccentric means fixed to said rotatable shaft near the attachment of said first and second elements, and
a universal link means, disposed in said first and second elements near the attachment of said first and second elements, fixed to said rotatable eccentric means and to said reciprocatable tool block to convert the rotary motion of said rotary pneumatic motor directly to reciprocating movement of said tool block.

* * * * *